US012617916B2

(12) United States Patent
Park

(10) Patent No.: US 12,617,916 B2
(45) Date of Patent: May 5, 2026

(54) MANUFACTURING METHOD OF FOAM SHEET FOR SHOES WITH TPU POWDER AND RECYCLED PU SCRAP POWDER

(71) Applicant: SAM BU FINE CHEMICAL CO., LTD., Gimhae-si (KR)

(72) Inventor: Heedae Park, Busan (KR)

(73) Assignees: Heedae Park, Busan (KR); SAM BU FINE CHEMICAL CO., LTD., Gimhae-si (KR)

( * ) Notice: Subject to any disclaimer, the term of this patent is extended or adjusted under 35 U.S.C. 154(b) by 0 days.

(21) Appl. No.: 18/946,687

(22) Filed: Nov. 13, 2024

(65) Prior Publication Data

US 2025/0136775 A1    May 1, 2025

Related U.S. Application Data

(62) Division of application No. 18/616,061, filed on Mar. 25, 2024, now Pat. No. 12,359,035.

(30) Foreign Application Priority Data

Mar. 23, 2023    (KR) ........................ 10-2023-0037864
Aug. 28, 2023    (KR) ........................ 10-2023-0112717

(51) Int. Cl.
  *A43B 17/14*        (2006.01)
  *A43B 17/00*        (2006.01)
      (Continued)
(52) U.S. Cl.
  CPC ........... *C08J 9/0061* (2013.01); *A43B 17/006* (2013.01); *A43B 17/14* (2013.01);
      (Continued)

(58) Field of Classification Search
  CPC ..... A43B 17/003; A43B 17/006; A43B 17/14; A43B 23/0215; A43B 23/0235;
      (Continued)

(56) References Cited

U.S. PATENT DOCUMENTS 4,451,583 A    5/1984   Chesler
4,591,469 A    5/1986   Buchanan
      (Continued)

FOREIGN PATENT DOCUMENTS

WO        2007 141171 A1    12/2007

*Primary Examiner* — Michael A Tolin
(74) *Attorney, Agent, or Firm* — Goldilocks ZONE IP LAW

(57)        ABSTRACT

The present invention relates to a manufacturing method for a foam sheet for shoes containing Thermoplastic polyurethane (TPU) powder and recycled Polyurethane (PU) scrap powder, the foam sheet manufactured by the method thereof, and the foam sheet produced an eco-friendly polyurethane foam composition by water foam, where the method includes firstly the recycled PU scrap powder is mixed with polyol, and then the processing speed in a process is controlled through a side-feeder to react while adding the TPU powder and recycled PU scrap powder secondarily, thereby preventing a rise in viscosity of the raw material, so that even if a larger amount of recycled materials is used than before, it is possible to form foam sheets for shoes, such as shoe insoles or foam packages for shoe uppers, with the same level of product quality as conventional products.

4 Claims, 1 Drawing Sheet

(51) Int. Cl.

| | |
|---|---|
| *A43B 23/02* | (2006.01) |
| *B29C 44/34* | (2006.01) |
| *B29C 44/56* | (2006.01) |
| *B29C 51/14* | (2006.01) |
| *B29C 65/48* | (2006.01) |
| *B29D 35/14* | (2010.01) |
| *B29K 105/16* | (2006.01) |
| *B29K 105/26* | (2006.01) |
| *B32B 5/02* | (2006.01) |
| *B32B 5/18* | (2006.01) |
| *B32B 5/24* | (2006.01) |
| *B32B 37/12* | (2006.01) |
| *C08J 9/00* | (2006.01) |
| *B29K 75/00* | (2006.01) |
| *B29K 105/00* | (2006.01) |

(52) U.S. Cl.
CPC ...... *A43B 23/0215* (2013.01); *A43B 23/0235* (2013.01); *B29C 44/3442* (2013.01); *B29C 44/5681* (2013.01); *B29C 51/145* (2013.01); *B29C 65/4805* (2013.01); *B29C 65/4815* (2013.01); *B29D 35/14* (2013.01); *B29D 35/142* (2013.01); *B29D 35/146* (2013.01); *B32B 5/02* (2013.01); *B32B 5/18* (2013.01); *B32B 5/245* (2013.01); *B32B 37/1207* (2013.01); *B29C 2793/0027* (2013.01); *B29K 2075/00* (2013.01); *B29K 2105/16* (2013.01); *B29K 2105/251* (2013.01); *B29K 2105/26* (2013.01); *B32B 2037/1223* (2013.01); *B32B 2262/0276* (2013.01); *B32B 2262/0292* (2013.01); *B32B 2266/0278* (2013.01); *B32B 2272/00* (2013.01); *B32B 2274/00* (2013.01); *B32B 2305/30* (2013.01); *B32B 2437/02* (2013.01); *C08J 2375/04* (2013.01); *C08J 2475/04* (2013.01)

(58) Field of Classification Search
CPC ..... B29C 44/34; B29C 44/3442; B29C 44/56; B29C 44/5627; B29C 44/5636; B29C 44/5681; B29C 51/002; B29C 51/004; B29C 51/02; B29C 51/14; B29C 51/145; B29C 51/32; B29C 51/42; B29C 65/48; B29C 65/4805; B29C 65/481; B29C 65/4815; B29C 69/001; B29C 2493/00; B29C 2493/0009; B29C 2493/0027; B29D 35/12; B29D 35/122; B29D 35/128; B29D 35/14; B29D 35/142; B29D 35/146; B29D 35/148; B29K 2075/00; B29K 2105/04; B29K 2105/06; B29K 2105/16; B29K 2105/251; B29K 2105/26; B32B 5/02; B32B 5/18; B32B 5/245; B32B 37/12; B32B 37/1207; B32B 2037/1215; B32B 2037/1223; B32B 38/0004; B32B 2262/0276; B32B 2262/0284; B32B 2262/0292; B32B 2272/00; B32B 2274/00; B32B 2305/30; B32B 2437/02; C08J 3/12; C08J 9/0014; C08J 9/0023; C08J 9/0028; C08J 9/0061; C08J 9/04; C08J 9/06; C08J 9/12; C08J 9/125; C08J 11/04; C08J 11/06; C08J 2203/10; C08J 2300/30; C08J 2375/04; C08J 2375/06; C08J 2375/08; C08J 2475/04; C08J 2475/06; C08J 2475/08

See application file for complete search history.

(56) References Cited

U.S. PATENT DOCUMENTS

| | | | | |
|---|---|---|---|---|
| 5,346,934 A | 9/1994 | Chriss | | |
| 7,943,676 B2 | 5/2011 | Chang | | |
| 2005/0209354 A1 | 9/2005 | Matel | | |
| 2010/0047550 A1* | 2/2010 | Prissok | .............. | C08G 18/3206 |
| | | | | 428/313.5 |
| 2021/0139638 A1* | 5/2021 | Liang | .................... | C08G 18/78 |
| 2021/0251336 A1 | 8/2021 | Park | | |

* cited by examiner

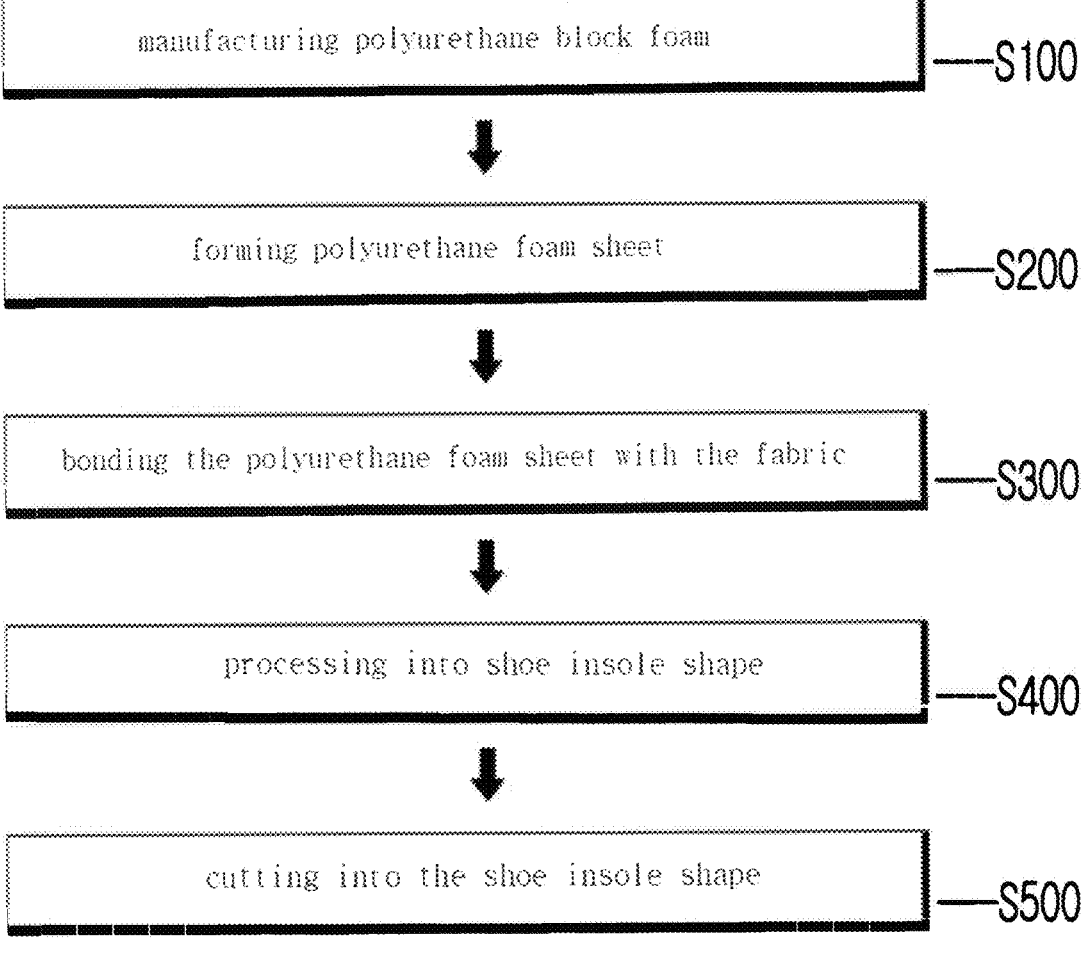

MANUFACTURING METHOD OF FOAM SHEET FOR SHOES WITH TPU POWDER AND RECYCLED PU SCRAP POWDER

CROSS-REFERENCES TO RELATED APPLICATION

The present application is a divisional application of U.S. application Ser. No. 18/616,061 filed Mar. 25, 2024, which claims priority under 35 U.S.C. § 119 to Korean Patent Application No. 10-2023-0037864 filed on Mar. 23, 2023, and Korean Patent Application No. 10-2023-0112717 filed on Aug. 28, 2023, in the Korean Intellectual Property Office, the disclosures of which are incorporated herein by references in their entireties.

TECHNICAL FIELD

The present invention relates to a method for the manufacture of a foam sheet for shoes containing TPU powder and recycled PU scrap powder, and more specifically, for an eco-friendly polyurethane foam composition by water foam, recycled PU scrap powder is mixed with polyol, and then TPU powder and recycled PU scrap powder are added through a side-feeder, so that even if a larger amount of recycled material is used than conventionally, the quality of the shoe foam sheet products such as shoe insoles or foam packages for shoe uppers is good, It relates to the manufacturing method of foam sheet for shoes containing TPU powder and recycled PU scrap powder, which can reduce the molding time in the process of processing by heat press by half due to the addition of the TPU powder.

BACKGROUND OF THE INVENTION

In general, various types of shoes such as shoes, sneakers, and hiking boots may include an upper leather that forms the exterior of the shoe, an outsole that contacts the ground, a midsole that is installed on the upper side of the outsole, and an insole that contacts a sole (Insole, hereinafter referred to as 'insole').

At this time, the insole is installed on the inner bottom surface of the shoes to mitigate the impact force applied from the ground to the sole of the foot during walking and is formed to improve comfort and hygiene.

Various functions have been added to the shoe insole as described above based on the research result that foot health is a very important factor for the human body. For example, insoles are molded into an ergonomic structure that can effectively absorb shock, or materials to improve sweat absorption, antibacterial and deodorizing functions are being developed. Recently, a technology has been proposed to prevent frostbite in the winter by providing a heating function by embedding a heat wire in a shoe insole.

In addition, as materials widely used for the shoe insole, polyurethane (PU), ethylene-vinyl acetate (EVA), polyethylene (PE), latex material, etc. are foam-molded and manufactured in a form of a foam sheet. They are usually bonded to fabrics woven from natural or artificial fibers using adhesives or hot melt films.

This bonding process has an advantage of reducing the process time and number of workers compared to the sewing process by applying a liquid adhesive to the adherend and bonding it to the fabric in a state where the solvent or moisture is volatilized through drying. However, in order to maximize cost reduction, instead of using a liquid adhesive, a process of bonding the fabric with a heat press using a thermoplastic hot melt film is widely applied. As described above, it is common to go through a molding process in which the foam sheet combined or bonded with the fabric is processed into a shoe insole shape by a high-temperature heat press.

A related art of manufacturing an insole for shoes using the foam sheet as described above, Korea Patent Publication No. 10-2009-0086791, titled "ADHESION-TYPE SHOES CUSHIN USING HIGH DENSITY POLYURETHANE FOAM AND MANUFACTURING METHOD," an adhesive shoes cushion using high density polyurethane foam, provided is a related art a method for manufacturing an insole for shoes by using the foam sheet, comprising: a cushion layer which is formed by cutting and molding a high density polyurethane foam having a density of 0.8-1.0 g/cm$^3$ into a shape of a shoes cushion by heat-treating the high density polyurethane foam and pressurizing the same with a cooling press in order to prevent slipping of a foot by being attached to the bottom surface of the shoes and to have excellent impact absorption and restoring force; an adhesive layer coated with polyacrylate, natural rubber or synthetic rubber adhesive, and heat-melting adhesive on a surface to which the cushion layer is attached to an object; a release layer protecting the adhesive layer, wherein the cushion layer, an adhesive layer, and the release paper layer are sequentially stacked.

In addition, in Korean patent No. 10-1569659, titled "BEAD FOAM COMPRESSION MOLDING METHOD FOR LOW DENSITY PRODUCT," a method for molding a foamed article, comprising: placing a desired amount of thermoplastic polyurethane foam beads in a compression mold in the shape of an article, wherein the thermoplastic polyurethane foam beads have a density of from about 0.01 to about 0.3 g/cm$^3$; closing the mold; bringing the mold to a peak temperature of from about 130° C. to about 180° C. over a period of from about 300 to about 1500 seconds; cooling the mold to a temperature of from about 5° C. to about 80° C. over a period of from about 300 to about 1500 seconds within about 30 seconds after the peak temperature is reached; and removing the foamed article, is disclosed.

In addition, Korean Patent Nos. 10-2096984 (BASF SE) is a combinatorial foam containing a matrix composed of polyurethane foam and the thermoplastic polyurethane foam particles contained therein, matrix and particle composed of a polyol component and a polyisocyanate component, respectively, which are equal to or more than 50% of the basic building blocks forming the matrix and particles, and 50 wt % or more of the basic constituent blocks forming the polyisocyanate component of the matrix and particles are the same, thereby relates to a combinatorial foam in which the matrix is completely continuous and the foam particles in the matrix are few or partially independent.

According to the dot-composite shoes insole using an adhesive resin mixed with hydrophobic nano-silica and its manufacturing method developed by the present inventor in Korean Patent No. 10-2131606, nano-silica containing a hydrophobic functional group is mixed with the adhesive resin to form an adhesive resin. Dispersibility within the shoes is improved, water resistance is strengthened, and tensile strength is increased. In addition, the adhesive resin is applied to the foam and/or fabric using a transfer roller with a mesh-type engraved dot pattern in the shape of the shoes insole. By transferring and molding to one side of the fabric, it prevents the overflow phenomenon and not only has excellent adhesion performance, but also provides more uniform adhesion than conventional products even when a thinner thickness, 10~40 μm, of adhesive resin is applied. It has the effect of securing strength and excellent durability and providing a soft texture while making the product lighter and reducing material costs.

Korean Patent No. 10-2131606 discloses an adhesive resin applied to the surface of a transfer roller with an imprinted dot pattern, and removes the adhesive resin and presses the imprinted dot pattern into the shape of a shoes insole. By transferring and pressing the adhesive resin applied to the surface of the transfer roller with a mesh-type dot pattern onto one side of the foam and the other side of the fabric, about 35 to 40 wt % of the scrap generated after cutting the shape of the shoes insole can be easily separated into the foam and the fabric and recycled, which has the advantage of being environmentally friendly and reducing costs.

On the other hand, according to aspects of the present invention, an eco-friendly polyurethane foam composition made by water foaming is reacted by first mixing recycled PU scrap powder with polyol and then adding TPU powder and recycled PU scrap powder through a side-feeder while reacting, so that the quality of foam sheet products for footwear, such as foam packages for shoes insoles or shoes uppers, is excellent even if a larger amount of recycled material is used than in the past, and a method for manufacturing foam sheet products for footwear is studied, which can shorten the molding time in the process of processing by heat press.

RELATED ARTS

Patent Documents (Patent Document 0001) Korea Patent Application Publication No. 10-2009-0086791 (Publication date Aug. 14, 2009).
(Patent Document 0002) Korea Patent No. 10-1569659 (issued date Nov. 16, 2015).
(Patent Document 0003) Korea Patent No. 10-2096984 (issued date Apr. 3, 2020).
(Patent Document 0004) Korea Patent No. 10-2131606 (issued date Jul. 8, 2020).

INVENTION DISCLOSURE

Problems to be Solved

The purpose of the present invention is to provide an eco-friendly polyurethane foam composition made by water foaming, in which recycled polyurethane (PU) scrap powder is mixed with polyol as a first step, and then TPU (thermoplastic polyurethane) powder and recycled PU scrap powder are added as a second step by controlling the processing speed of the process through a side-feeder to prevent the viscosity of the raw material from rising, so that a foam sheet for footwear, such as a foam package for shoes insoles or shoes uppers, can be formed with a product quality equivalent to that of a conventional product even if a larger amount of recycled material is used than conventionally. By including polyurethane foam composition contains TPU powder with an average particle size of 50 to 300 $\mu$m, thereby reducing the process time for putting the polyurethane foam sheet formed therefrom into a mold and molding it by heat press by half, thereby reducing the product.

Means for Solving the Problems

A method for manufacturing a foam sheet for shoes containing TPU powder and recycled PU scrap powder according to an aspect of the present invention, the method may use a polyurethane foam composition, which includes polyol, isocyanate, chain extender, and 0.1 to 2 wt % of water as a foaming agent based on the total weight of the polyurethane foam composition, the method may include preparing a polyurethane foam composition mixed with the polyol at a ratio of 10 to 20 wt % by weight of recycled PU scrap powder based on the total weight of the polyurethane foam composition S100; adding 5 to 30 wt % by weight of TPU powder and 10 to 30 wt % by weight of recycled PU scrap powder through a side-feeder based on the total weight of the polyurethane foam composition for reacting to produce polyurethane block foam S200; cutting the polyurethane block foam to a predetermined thickness to form a polyurethane foam sheet S300; bonding the polyurethane foam sheet cut to a predetermined thickness with the fabric S400; and putting the polyurethane foam sheet combined with the fabric into a mold and molding and cutting it into a product of a predetermined shape by heat pressing S500.

According to a preferred embodiment of the present invention, the recycled PU scrap powder may be recycled PU scrap powder ground to an average particle size of 50-300 $\mu$m, and Thermoplastic polyurethane (TPU) powder is made by using either virgin TPU or recycled TPU with an average particle size of 50~300 $\mu$m alone or by mixing them.

The adhesive used in the step S400 for bonding the polyurethane foam sheet with the fabric is a liquid adhesive or a hot melt film made of any one resin composition selected from thermoplastic polyurethane (TPU) or ethylene vinyl acetate (EVA), and the product having a predetermined shape is any one of foam packages for shoes insole or shoes uppers.

Effects of the Present Invention

A method for manufacturing a foam sheet for shoes containing TPU powder and recycling powder according to an aspect of the present invention may include: a step of mixing recycling polyurethane (PU) foam composition, which is made by water foaming, with polyol; and a step of adding TPU powder and recycled PU scrap powder for adjusting processing speed of a reaction, through a side-feeder, to prevent the viscosity of raw materials from increasing, thereby forming a shoes foot foam sheet such as a shoes insole or a shoes upper foam package having the same quality as an conventional product even if a large amount of recycled materials are used.

In addition, the polyurethane foam composition may contain thermoplastic polyurethane (TPU) powder having an average particle size of 50 to 300 $\mu$m, so that the polyurethane foam sheet formed therefrom is putted into a mold and the time required for a process of molding the polyurethane foam sheet by a heat press is reduced to a half level, thereby significantly improving product productivity, reducing expensive energy costs, and significantly reducing carbon emissions.

BRIEF DESCRIPTION OF THE DRAWINGS

FIG. 1 is a process flow chart showing a method for manufacturing a foam sheet for shoes according to the present invention.

DETAILED EMBODIMENTS OF THE PRESENT INVENTION

Hereinafter, a method for manufacturing a foam sheet for shoes containing TPU powder and recycled PU scrap powder of the present invention will be described with reference to the drawings. However, the method is intended to be exemplary so that a person with ordinary skills in the art to which the present invention belongs can easily implement the present invention, and does not imply that the technical ideas and categories of the present invention are limited.

In general, polyurethane resin is a resin produced based on a urethane bond generated by the reaction of an isocyanate group (—NCO) and a hydroxyl group (—OH) in a polymer, and its raw materials may include polyol, isocyanate, and a chain extender, etc. By adjusting the ratio of soft and hard segments that make up polyurethane, it is possible to design a variety of polyurethane foams, from elastic products such as rubber to hard products such as plastic.

The polyurethane resin has excellent film strength and adhesive strength, thereby being able to manufacture a thin coating film. The coating film has excellent elasticity, thereby being able to be manufactured into a soft-porous film or sheet, thereby imparting moisture permeability and air permeability. In addition, the polyurethane resin has excellent cold resistance, and is processed without using a plasticizer, thereby reducing workability problems caused by the plasticizer.

In addition, the polyol is an active hydrogen compound used to react with isocyanate to prepare polyurethane, wherein the polyol has two or more active hydrogen groups such as hydroxyl groups, carboxyl groups, and amine groups in the molecule, and directly affects the physical properties of the polyurethane by using various types according to molecular structure, molecular weight, functionalities, and OH-values.

For example, polyurethane using polyester polyol has higher tensile strength, hardness and elongation than polyurethane using polyether polyol, is superior in flame retardancy, has excellent drug resistance and chemical resistance, is resistant to oxidation, and has excellent adhesion to various fabrics woven with polyester or nylon. However, unlike polyether polyol, it has a weak water resistance due to its hydrolyzing property. However, since polyurethane using polyether polyol has excellent elasticity, can be used under high temperature and high humidity environment, and shows excellent durability against acid and alkali, it is preferable to use them alone or in combination depending on the application.

In a production of the polyurethane (PU) resin, polyurethane is produced by mixing polyether made by polymerization of ethylene oxide with diisocyanate, and Urethane is a mixed amide-ester that occurs when an alcohol group reacts with isocyanate. When triol is used instead of diol, cross-linking occurs to produce thermosetting polyurethane.

According to aspect(s) of the present invention, the foam sheet for shoes is manufactured by using a polyurethane foam composition comprising polyol, isocyanate, chain extender, and water in a range of 0.1-2 wt % as a foaming agent. The polyurethane foam composition may contain a recycle PU scrap powder in a range of 20~50 wt %, which is an average particle size in a range of 50~300 μm and TPU powder in a range of 5~30 wt %, which is the average particle size in a range of 50~300 μm based on the polyurethane foam composition total weight.

According to aspects of the present invention, a foam sheet having a hardness (ASKER C-Type) of 8 to 40 and a density of 0.05 to 0.35 $g/cm^3$ may be formed by including 0.1 to 2 wt % of water as a foaming agent based on the total weight of the polyurethane foam composition. The foam sheet may be used for a shoes insole, a foam package for shoes uppers, etc. Water as a foaming agent may be mixed with the polyol component in advance or mixed with the polyol component at the same time as mixing with the isocyanate component later.

The foaming agent may contain a predetermined amount of water, which is a low carbon source, in consideration of workability and eco-friendliness, thereby minimizing carbon emission and producing a polyurethane foam molded body having a desired density, and reacting water with an isocyanate compound to produce carbon dioxide gas. According to aspects of the present invention, it has been studied that a method of dispersing air or nitrogen gas in a polyol component in advance by using hydrocarbons such as carbon dioxide, chlorofluorocarbons, and the like, hydrocarbons such as pentane and cyclopentane, fluorinated hydrocarbons, or an air loading device as a foaming agent widely used in the past is not only poor in workability, but also undesirable in consideration of environmental hazards such as carbon emission and expensive energy costs.

According to aspects of the present invention, it is possible to significantly reduce molding time by containing thermoplastic polyurethane (TPU) powder having an average particle size of 50 to 300 μm in an amount of 5 to 30 wt % by weight based on the total weight of the polyurethane foam composition. Based on the fact that the thermoplastic polyurethane (TPU) powder has excellent physical and chemical miscibility with a polyurethane (PU) foam composition which is a polymer resin of the same kind, the thermoplastic polyurethane (TPU) powder is dispersed into a particle size having the most suitable kneadability, thereby obtaining excellent moldability by a heat press and excellent product quality such as homogeneity, elasticity, durability.

The TPU powder can adjust the particle size or the content thereof within a specified range according to the hardness and density of the desired molded body. if the average particle size of TPU powder is less than 50 μm, the blending property with the polyurethane foam composition is deteriorated, and if the average particle size of TPU powder exceeds 300 μm, the dispersibility becomes poor, thereby increasing the defect rate of the product manufactured after molding.

In addition, if a TPU powder in the polyurethane foam composition is less than 5 wt %, the effect of shortening the molding time by the heat press is insignificant. if the TPU powder in the polyurethane foam composition is more than 30 wt %, the setting of the process conditions for uniformly forming the hardness of the molded product is limited, and thus it is difficult to manufacture the foam molded product having the desired elasticity, i.e., cushionability.

The thermoplastic polyurethane (TPU) is a typical (AB) n-type copolymer and has a structure in which a hard segment and a soft segment are repeated. As a result of its thermal behavior and surface characteristics, it is highly durable, highly abrasive, flexible and workable, and is widely used as a material for surface coatings and artificial leather. It focuses on the fact that it is an elastomer capable of plastic processing by heat even if a separate plasticizer agent is not added.

A recycled PU scrap used in the present invention may be, for example, obtained from the manufacturing method of a dotted shoes insole using an adhesive resin mixed with hydrophobic nano-silica of Korean Patent No. 10-2131606 developed by the inventor of the present application, about 35 to 40 wt % of the scrap generated after cutting the shape of the shoes insole in a package in which the foam and the fabric are combined can be easily separated into a foam and a fabric, respectively, and recycled.

As described above, the PU scrap separated from the fabric is mixed with the recycled PU scrap powder crushed to the size of the average particle size of 50~300 μm through the step-by-step grinding process into the raw material (polyol), so that the formability is not deteriorated, but also the elasticity is good, which is advantageous to ensure the quality of the product stably.

Accordingly, according to an aspect of the present invention, an eco-friendly polyurethane (PU) foam composition made by a water foam may include a predetermined amount of Thermoplastic polyurethane (TPU) powder with an average particle size of 50 to 300 μm, and the polyurethane foam sheet formed therefrom is placed in a mold for molding. By reducing the molding process time of the polyurethane foam sheet by half by heat press, product productivity can be greatly improved, expensive energy costs can be reduced, and carbon emissions can be dramatically reduced.

In addition, according to an aspect of the present invention, firstly mixing recycled PU scrap powder with polyol and then secondarily adding TPU powder and recycled PU scrap powder by controlling the process conditions and processing speed through a side-feeder, thereby viscosity of the raw materials can be prevented from being increased. Accordingly, it is possible to form foam sheets for shoes, such as shoes insoles or foam packages for shoes uppers, with the same level of product quality as before, even if a larger amount of recycled materials are used than a conventional method.

As shown in FIG. 1, a method for manufacturing a foam sheet for shoes containing TPU powder and recycled PU scrap powder according to the present invention uses a polyurethane foam composition composed of polyol, isocyanate, chain extender, and 0.1-2 wt % of water as a foaming agent, the method may include: a step of producing a polyurethane foam composition in which recycled PU scrap powder is uniformly mixed with the polyol at a ratio of 10 to 20 wt % by weight based on the total weight of the polyurethane foam composition S100; a step of preparing a polyurethane block foam by reacting a polyurethane foam composition by adding 5-30 wt % of TPU powder and 10-30 wt % of recycled PU scrap powder based on the total weight of the polyurethane foam composition through a side-feeder and reacting the same S200; a step of forming a polyurethane foam sheet by cutting the polyurethane block foam to a predetermined thickness S300; a step of bonding the polyurethane foam sheet cut to a predetermined thickness with a fabric S400; and a step of putting the polyurethane foam sheet in the mold and molding and cutting into a predetermined shape by putting the fabric into the mold and molding and cutting into the predetermined shape by a heat press S500.

First, in the stage of preparing the polyurethane foam composition S100, a raw material may include polyol, isocyanate, chain extender, and 0.1~2 wt % of water by weight as a foaming agent based on the total weight of the polyurethane foam composition, the recycled PU scrap powder in a rate of 10~20 wt % by weight based on the total weight of the polyurethane foam composition is mixed with the polyol, and if the recycled PU scrap powder exceeds 20 wt % by weight based on the total weight of the polyurethane foam composition, the viscosity of the raw material will increase, and it will be difficult to knead for the subsequent foam reaction, so the reactivity will be poor.

For the reason mentioned above, conventionally, it was recognized as a general limit to recycle waste by limiting the content of recycled PU scrap powder mixed into the polyurethane foam composition to less than 20 wt % by weight, but, the process technology according to an aspect of the present invention that can include up to 50 wt % of recycled PU scrap powder and TPU powder 5~30 wt % by weight based on the total weight of the polyurethane foam composition by providing a separate side-feeder that can be injected into the recycled PU scrap powder as a secondary input is provided.

Accordingly, according to an aspect of the present invention, the process conditions and processing speed are adjusted through a side-feeder provided in the step of manufacturing polyurethane block foam S200, and TPU powder 5 to 30 wt % is added based on the total weight of the polyurethane foam composition and 10 to 30 wt % by weight of recycled PU scrap powder, respectively, an increase in the viscosity of the raw materials is prevented, thus, making the product for shoes insoles, shoes uppers, or a foam sheet for shoes of the same quality as a conventional method, even though a larger amount of recycled materials is used than the conventional method.

The polyurethane block foam formed as described above may have further processed, which include: a step of forming a polyurethane foam sheet by cutting the polyurethane block foam to a predetermined thickness within 1-10 mm (usually such as 2, 4, 5, 6 mm, etc.) S300 and a step of bonding the polyurethane foam sheet cut to a predetermined thickness with the fabric S400. The adhesive used in the step S400 of bonding the polyurethane foam sheet with a fabric is preferably a liquid adhesive or a hot melt film composed of any one resin composition selected from thermoplastic polyurethane (TPU) or ethylene vinyl acetate (EVA) having excellent compatibility with the polyurethane foam sheet.

The adhesive made of the thermoplastic polyurethane (TPU) or ethylene vinyl acetate (EVA) is eco-friendly by not using a solvent, has good workability and productivity, and is advantageous in securing adhesion to various fabrics due to characteristics of a flexible material. In particular, excellent durability can be secured by maintaining strong adhesion to the polyurethane foam sheet for a long period of time.

Next, the foam sheet for shoes is manufactured through a step S500 in which the polyurethane foam sheet bonded with the fabric is put into a mold and molded and cut into a product of a predetermined shape by a heat press. Typically, when a polyurethane foam sheet bonded with the fabric is put into a mold and molded by a heat press having a temperature of 150 to 200° C. and a pressure of 40 to 60 kgf/cm$^2$, the molding time required therefor can be greatly reduced. In the case of a shoes insole, the molding time can be reduced from about 100 seconds in a conventional art to 40 to 60 seconds in the present invention, and the foam package for shoes uppers can be reduced from about 40 seconds in a conventional art to about 10 to 30 seconds in the present invention.

According to the present invention, the thermoplastic polyurethane (TPU) powder having an average particle size of 50-300 μm is contained in a ratio of 5-30 wt % based on the total weight of the polyurethane foam composition, thereby improving the moldability of the polyurethane foam composition and shortening the molding time by half in the step 400 of processing the polyurethane foam composition into a shoes insole shape by a heat press.

In addition, firstly, recycled PU scrap powder with an average particle size of 50~300 μm is mixed with polyol, and then the processing speed is adjusted through a side-feeder to mix TPU powder and recycled PU scrap powder secondarily. By adding the TPU powder and the recycled PU scrap powder secondly into the first mixed composition for reacting, an increase in the viscosity of the raw materials can be prevented, despite using a larger amount of recycled materials than conventional method before.

It is possible to form foam sheets for shoes, such as foam packages for shoes insoles or shoe uppers, with product quality equivalent to those of conventional products.

That is, according to aspect(s) of the present invention, since TPU powder is included in the polyurethane foam composition, even if a heat press operation is performed under the same temperature and pressure conditions, the molding time to be processed into a foam sheet for shoes can be reduced to a half level. In addition, a large amount of PU foam scrap generated in a manufacturing process such as a shoes insole can be recycled, thereby being environmentally friendly and reducing costs.

The thermoplastic polyurethane (PU) powder is highly chemically compatible with the polyurethane foam composition of the same kind, and is highly moldable by a heat press as it is dispersed in a suitable size. If the average particle size of the TPU is less than 50 μm, the dispersibility of the polyurethane foam composition is poor, and if the average particle size of the TPU exceeds 300 μm, the dispersibility becomes poor, so there is a fear that the defect rate of the product manufactured after molding may increase. In addition, for the same reason, it is preferable that the maximum particle size of the particles contained in the TPU powder may not be exceeded 500 μm.

The TPU powder may be either virgin TPU or recycled TPU used alone or may be used by mixing them in a predetermined ratio. For example, a recycled TPU can be obtained by recovering and crushing a discarded airbag for shoes.

Hereinafter, a method for manufacturing a foam sheet for shoes containing TPU powder and recycled PU scrap pow- ▶ Step 2: Based on the total weight of the polyurethane foam composition through the side-feeder, 5~30 wt % of TPU powder with an average particle size of 150 μm and 10~30 wt % of recycled PU scrap powder were added and reacted to produce polyurethane block foam.

▶ Step 3: The polyurethane block foam was cut into 4 mm thick to form a polyurethane foam sheet.

▶ Step 4: The polyurethane foam sheet cut into 4 mm thickness was bonded with polyester fiber fabric using a thermoplastic polyurethane (TPU) hot melt film.

▶ Step 5: The polyurethane foam sheet bonded with the above fabric was put into a mold, molded and cut into a drawn insole shape by a heat press with a temperature of 170° C. and a pressure of 50 kgf/cm$^2$ to manufacture the shoes insole.

In the case of manufacturing a shoes insole such as in Example 1, in order to measure the molding time of processing the polyurethane foam sheet combined with the fabric by the heat press according to the ratio of recycled PU scrap powder and TPU powder included in the polyurethane foam composition in the first and the second steps, in the fifth step to process the polyurethane foam sheet into the shape of the shoes insole as in the comparative example 1, the same type of polyurethane foam sheet not containing TPU powder as in the comparative example 1 was tested in comparison with the molding time to process the shoes insole shape, Accordingly, the average value of the results of the evaluation of the molding time, formability, and appearance condition several times is shown in Table 1 below.

TABLE 1

| category | Example 1-1 | Example 1-2 | Example 1-3 | Example 1-4 | Example 1-5 | Example 1-6 | Example 1 |
|---|---|---|---|---|---|---|---|
| (step 1) PU scrap powder(wt %) | 10 | 10 | 15 | 15 | 20 | 20 | 15 |
| (step 2) TPU powder(wt %) | 5 | 10 | 15 | 20 | 25 | 30 | 0 |
| (step 2) PU scrap powder(wt %) | 30 | 25 | 20 | 20 | 15 | 10 | 0 |
| (step 5) Molding time(sec.) | 60 | 57 | 53 | 50 | 45 | 40 | 100 |
| Formability and appearance | good | good | good | good | good | good | good | der according to an aspect of the present invention will be described in detail, and an aspect of the present invention will be described through preferred embodiments that can be easily performed by a person with ordinary skills in the art to which the present invention belongs.

Example 1: Manufacturing of Shoes Insole

The shoes insole manufactured in accordance with the present invention is a method of polymerizing a polyurethane foam composition, which includes polyol, isocyanate, chain extender, and a foaming agent as water, and the method may include the following five steps.

▶ Step 1: Polyurethane foam composition comprising polyol and isocyanate and in the range of 0.1~2 wt % of water as foaming agent by weight based on the total weight, the polyurethane foam composition mixed with recycled PU scrap powder with an average particle size of 150 μm for the polyol at the ratio of 10~20 wt % by weight was prepared.

Example 2 Manufacturing of Foam Package for Shoes Upper

The foam package for the shoes upper manufactured in accordance with the present invention is a method of polymerization of a polyurethane foam composition, which comprises polyol, isocyanate, chain extender, and water as a foaming agent, and may include the following five steps.

▶ Step 1: Polyurethane foam composition comprising polyol, and isocyanate, chain extender, water as foaming agent in the range of 0.1~2% by weight based on the total weight of the Polyurethane foam composition, the polyol is mixed with recycled PU scrap powder with an average particle size of 150 μm for the polyol at the ratio of 10~20% by weight.

▶ Step 2: Based on the total weight of the polyurethane foam composition through the side-feeder, 5~30 wt % of TPU powder with an average particle size of 150 μm and 10~30 wt % by weight of recycled PU scrap powder were added and reacted to produce polyurethane block foam.

▶ Step 3: The polyurethane block foam was cut into 2 mm thick to form a polyurethane foam sheet.

▶ Step 4: The polyurethane foam sheet cut into 2 mm thickness was bonded with PU skin film fabric using thermoplastic polyurethane (TPU) hot melt film.

▶ Step 5: The polyurethane foam sheet combined with the above fabric was put into a mold, and the foam package for the shoes upper was formed and cut into a foam package for the shoes upper by a heat press with a temperature of 170° C. and a pressure of 50 kgf/cm².

In the case of manufacturing a foam package for the shoes upper as shown in the embodiment 2, in order to measure the molding time of processing the polyurethane foam sheet combined with the fabric by the heat press according to the ratio of recycled PU scrap powder and TPU powder included in the polyurethane foam composition in the first and the second steps, the molding time of processing the polyurethane foam sheet which did not contain TPU powder into the foam package shape for the shoes upper was tested compared to the molding time of processing the polyurethane foam sheet for the shoes upper into the foam package shape as in the comparative example 2, Accordingly, the average value of the results of the evaluation of the molding time, formability, and appearance condition several times is shown in Table 2 below.

TABLE 2

| category | Example 2-1 | Example 2-2 | Example 2-3 | Example 2-4 | Example 2-5 | Example 2-6 | Comparative Examples 2 |
|---|---|---|---|---|---|---|---|
| (1 step) PU Scrap Powder(wt %) | 10 | 10 | 15 | 15 | 20 | 20 | 15 |
| (2 step) TPU powder(wt %) | 5 | 10 | 15 | 20 | 25 | 30 | 0 |
| (2 step) PU scrap powder(wt %) | 30 | 25 | 20 | 20 | 15 | 10 | 0 |
| (5 step) Forming time(seconds) | 25 | 23 | 22 | 20 | 18 | 15 | 40 |
| Formability and appearance | good | good | good | good | good | good | good |

As shown in [Table 1] and [Table 2], the shoes insole manufactured by embodiments 1-1 to 1-6 and the foam package for shoes uppers manufactured by embodiments 2-1 to 2-6 are found to have excellent moldability, adhesion between the fabric and the polyurethane foam sheet, and appearance quality, as shown in each the comparative example 1 or the comparative example 2.

However, when the content of the TPU powder exceeds 30 wt %, a part of the TPU powder present in the polyurethane foam sheet is melted during the molding operation by the heat press, and thus the density and hardness of the insole product may be uneven as a part of the overflow phenomenon is observed in a joint portion where the fabric and the polyurethane foam sheet are bonded.

As described above, the present invention may include the TPU powder of a predetermined particle size in the eco-friendly polyurethane foam composition at an appropriate ratio, thereby reducing a time required for molding the polyurethane foam sheet bonded by fabric into a shoes insole shape by a heat press to a half level, thereby significantly improving product productivity and reducing expensive energy costs.

According to an aspect of the present invention, firstly, recycled PU scrap powder having a predetermined particle size is mixed with polyol in a polyurethane foam composition, by adjusting process conditions and processing speed through a side-feeder, TPU powder and recycled PU scrap powder are added and reacted secondarily to prevent an increase in the viscosity of the raw material.

It was confirmed that a foam sheet for shoes, such as a foam package for a shoe upper, can be formed the same quality as existing ones even if a larger amount of recycled material, i.e. recycled PU scrap powder, is used than before.

EXPERIMENTAL EXAMPLES

In order to confirm the exemplary characteristics of the polyurethane foam composition according to the present invention, two kinds of polyurethane foam sheets (shoes insole, shoes upper foam package) containing 20 wt % of thermoplastic polyurethane (TPU) powder having an average particle size of about 150 μm and 35 wt % of recycled PU scrap powder were manufactured under the same conditions as existing heat presses (temperature 150-200° C. & pressure 40-60 kgf/cm²), the results of several tests on the physical properties thereof are shown in [Table 3].

13
14

TABLE 3

| Properties | unit | Shoes insoles | Foam package for shoes upper |
|---|---|---|---|
| hardness (ASKER C) | — | 30/29/29/30/29 | 19/19/19/20/20 |
| density | g/cm$^3$ | 0.148/0.148/0.148 | 0.142/0.143/0.143 |
| Tear Strength | kgf/cm | 3.1/3.0/3.1 | 2.4/2.4/2.6 |
| Tensile strength | kgf/cm$^2$ | 6.4/6.1/6.6 | 5.6/5.3/5.4 |
| Elongation rate | % | 105/105/111 | 123/110/118 |
| Shrinkage rate | % | 0.18/0.17/0.15 | 0.09/0.05/0.05 | hardness: ASKER C type Durometer based on JIS K 7312.

As shown in Table 3, the foam sheet for shoes containing the TPU powder and the recycled PU scrap powder according to the present invention reduces molding time by heat press to a half level compared to that of the conventional art. However, it is confirmed that the overall physical properties such as tear strength, tensile strength, elongation, shrinkage, etc. can be manufactured at the same level as conventional polyurethane foam sheets without having TPU powder. The polyurethane foam molded body has a hardness range of ASKER C-Type 8~40 and density 0.05~0.35 g/cm$^3$.

According the foam sheet for shoes containing the TPU powder and the recycled PU scrap powder manufactured by aspect(s) of the present invention can be substituted, modified, and changed in various forms within a range not departing from the scope and spirit of the invention. In particular, the present invention is eco-friendly to the environment and reduces productivity and manufacturing costs.

Accordingly, the present invention can be applied to various kinds of foam packages for shoe insoles and shoe uppers, which require uniform moldability and durability, as well as various applications requiring functions such as molding materials, buffering materials, and fillers used inner parts of clothes, bags, sporting goods, household goods, and industrial goods manufactured with fibers, natural and synthetic leather, plastics, etc.

What is claimed is:

1. A foam sheet for shoes comprising:
a polyurethane (PU) foam sheet bonded to a fabric, wherein the PU foam sheet has a thickness and a face surface formed by cutting, and the PU foam sheet comprises:
a cured PU foam composition comprising the reaction product of a polyol, an isocyanate, a chain extender and 0.1 to 2 wt % of water as a foaming agent, based on the total weight of the PU foam composition,
20 to 50 wt % recycled PU scrap powder having an average particle size of 50 to 300 μm, and
5 to 30 wt % un-foamed thermoplastic polyurethane (TPU) powder,
wherein the recycled PU scrap powder and the un-foamed TPU powder are dispersed in the cured PU foam composition,
wherein the PU foam sheet bonded to the fabric has a predetermined shape of a product formed by cutting.

2. The foam sheet for shoes containing TPU powder and recycled PU scrap powder of claim 1, wherein the un-foamed TPU powder is used anyone selected from the group consisting of virgin TPU with an average particle size of 50 to 300 μm and recycled TPU with an average particle size of 50 to 300 μm or a combination thereof.

3. The foam sheet for shoes containing TPU powder and recycled PU scrap powder of claim 1, wherein an adhesive agent used for bonding the polyurethane foam sheet with the fabric is a liquid adhesive or hot melt film made of one resin composition selected from the group consisting of thermoplastic polyurethane (TPU) or ethylene vinyl acetate (EVA).

4. The foam sheet for shoes containing TPU powder and recycled PU scrap powder of claim 1, wherein the predetermined shape of the product corresponds to a foam package for a shoe upper or a shoe insole.

* * * * *